(12) United States Patent
Porst

(10) Patent No.: US 9,189,445 B2
(45) Date of Patent: Nov. 17, 2015

(54) METHOD AND DEVICE FOR SYNCHRONIZING DATA BROADCASTS FOR SYSTEM-ON-CHIP

(75) Inventor: Uwe Porst, Dresden (DE)

(73) Assignee: Intel Mobile Communications GmbH, Neubiberg (DE)

( * ) Notice: Subject to any disclaimer, the term of this patent is extended or adjusted under 35 U.S.C. 154(b) by 477 days.

(21) Appl. No.: 13/023,622

(22) Filed: Feb. 9, 2011

(65) Prior Publication Data

US 2011/0202785 A1    Aug. 18, 2011

(30) Foreign Application Priority Data

Feb. 12, 2010    (DE) .................................. 101 53 465

(51) Int. Cl.
*G06F 1/12*      (2006.01)
*G06F 13/42*     (2006.01)

(52) U.S. Cl.
CPC .................................. *G06F 13/4226* (2013.01)

(58) Field of Classification Search
USPC ................................................. 713/400, 500
See application file for complete search history.

(56) References Cited

U.S. PATENT DOCUMENTS

| 6,249,875 B1 * | 6/2001 | Warren ........................ 713/400 |
| 8,000,305 B2 * | 8/2011 | Tan et al. ..................... 370/335 |
| 2004/0209575 A1 | 10/2004 | Goodnow et al. |
| 2007/0183549 A1 * | 8/2007 | Angello et al. ............... 375/370 |
| 2007/0268990 A1 * | 11/2007 | Warren ........................ 375/355 |
| 2008/0317181 A1 * | 12/2008 | Suzuki et al. ................. 375/355 |
| 2009/0181689 A1 * | 7/2009 | Lee et al. ...................... 455/450 |
| 2009/0245194 A1 * | 10/2009 | Damnjanovic et al. ....... 370/329 |
| 2009/0323543 A1 * | 12/2009 | Shimakura .................... 370/252 |
| 2010/0157797 A1 * | 6/2010 | Dinescu ..................... 370/230.1 |
| 2011/0211461 A1 * | 9/2011 | Bahr et al. .................... 370/245 |

FOREIGN PATENT DOCUMENTS

| WO | 02/23791 A2 | 3/2002 |
| WO | 2009/072134 A2 | 6/2009 |

* cited by examiner

*Primary Examiner* — Mohammed Rehman
(74) *Attorney, Agent, or Firm* — Schwegman Lundberg & Woessner, P.A.

(57) ABSTRACT

A method and a device for synchronizing broadcast of streaming data by a transmitting data processing unit to a plurality of receiving data processing units is provided. After a data word has been sent, a synchronizer in the transmitting data processing unit collects an acknowledge signal from each of the receiving data processing units and then generates an indication that the next data word can be transmitted. This allows to speed-up data delivery to parallel working processing units in a system-on-a-chip since data delivery has no longer to account for a maximum predictable latency of the respective receiving units.

8 Claims, 5 Drawing Sheets

Level based, high active synchronizer

Pulse based, high active synchronizer

SSL data transfers

METHOD AND DEVICE FOR SYNCHRONIZING DATA BROADCASTS FOR SYSTEM-ON-CHIP

FIELD AND BACKGROUND OF THE INVENTION

The present invention relates to the synchronization of data streams for broadcast applications. More specifically, the invention relates to a device and a method for simultaneous data delivery in a system-on-a-chip environment.

Large Systems-on-a-Chip (SOCs) usually consist of several building blocks each of them comprising data processing units, potentially together with a local controller, that perform some sort of defined (sub-) task. Such SoCs are employed for mobile communication applications, e.g., but not exclusively.

In the case of an SoC for wireless communication applications, these building blocks are the various components of the transmit and receive system, such as for example an input filter unit, a demodulation unit, a forward error correction (FEC) unit, a fast Fourier transform (FFT) unit, a parameter estimation unit and the like, which components will be coupled to each other in a chain, ring, or some combination of such schemes, depending on the data processing algorithms used. With such an architecture, it might be desired or necessary for a particular unit or processing stage to simultaneously deliver the same data to two or more subsequent processing units or stages, which units will then work in parallel using the same input data to perform different processing tasks. To give an example, a data element can be transferred to two filters which work in parallel to each apply a different filter function on the same input data element.

More generally speaking, there is a system, where data streams have to be broadcasted by a transmitting unit to a plurality of receiving units which is exemplified in FIG. 1 by transmitter 10 and receivers 1-3. Since each data stream to a respective receiver has a different speed and each receiver acts independently, the transmitter, after having sent a first data word, Data1 in FIG. 1, has to wait a predefined time which accounts for the maximum predictable latency of the respective receivers before the second data word, Data2, is transmitted to ensure that all receivers have received the first data word before the second data word is delivered.

It is an object of the present invention to accelerate processing in systems-on-a-chip. More particular, an object of the invention is to speed-up data delivery to parallel working processing units.

BRIEF SUMMARY OF THE INVENTION

The invention provides a method for synchronizing broadcast of streaming data and a device for synchronizing broadcast of streaming data.

The invention contemplates to use a handshake-type data streaming protocol for broadcasting streaming data from a transmitting data processing stage to a plurality of receiving data processing stages which then simultaneously use the same input data to perform different processing tasks thereon. In this way, each transmitted data word is confirmed by each of the receiving data processing stages. The transmitting data processing stage waits until all of the receiving data processing stages have acknowledged the received data word before transmitting the next data word.

BRIEF DESCRIPTION OF THE DRAWING FIGURES

Additional features and advantages of the present invention will be apparent from the following detailed description of a specific embodiment which is given by way of example only and in which reference will be made to the accompanying drawings, wherein.

DETAILED DESCRIPTION

Figure 1:
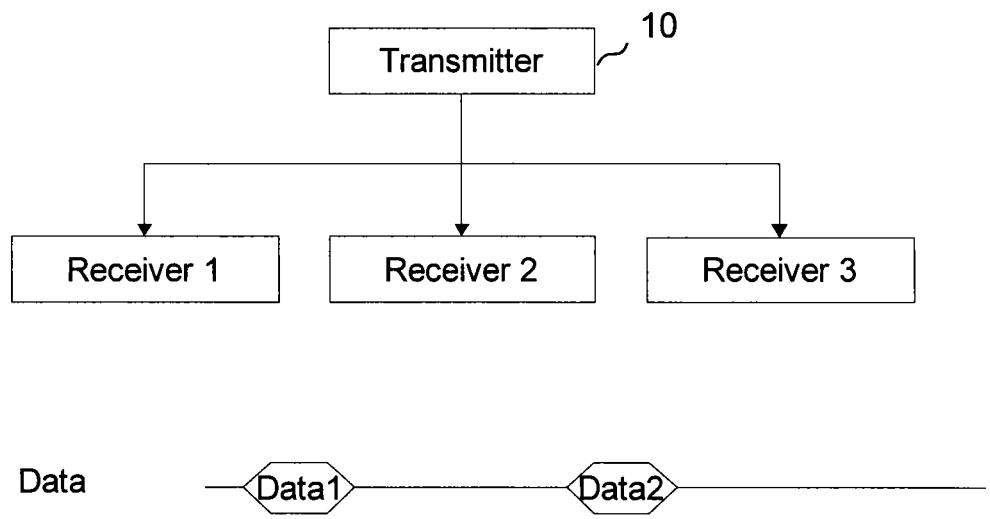
FIG. 1 illustrates a known scenario of broadcasting subsequent data elements.
Figure 2A:
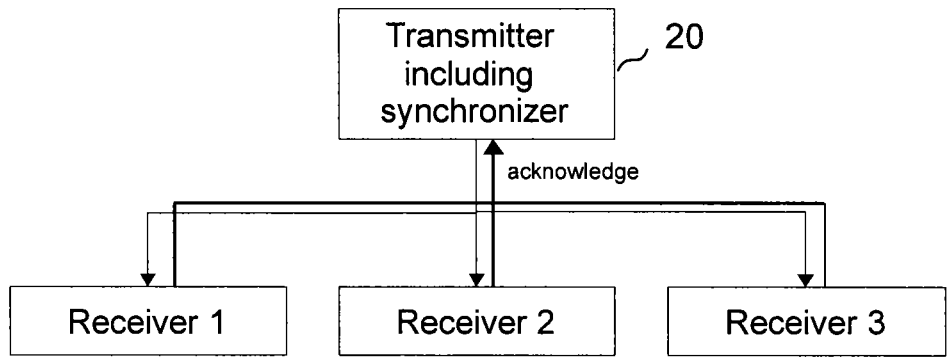
FIG. 2 illustrates a data broadcasting scenario and signal flow according to the invention.
Figure 2B:
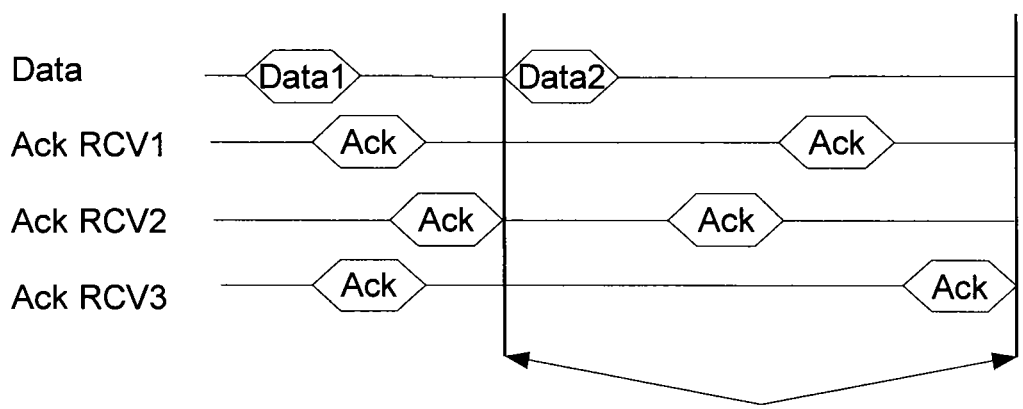
Figure 3:
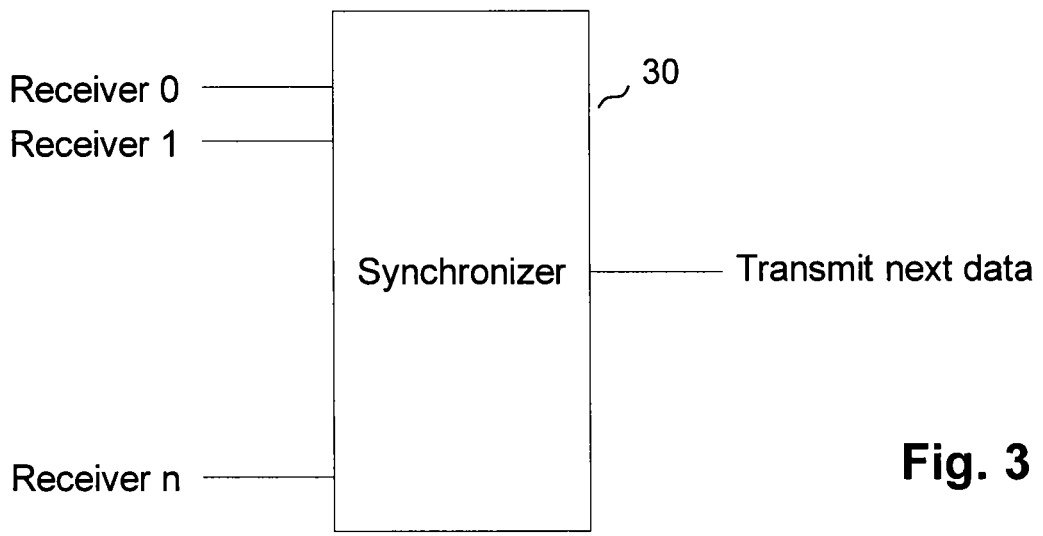
FIG. 3 is a block diagram of the synchronizer according to the invention.

The principle aspect of the invention is illustrated in FIGS. 2A, 2B, and 3. Since each data stream has a different speed and each receiver acts independently the acknowledge latency is not predictable. In the example shown in FIG. 2B, after transmitter 20 has broadcasted a first data word, data1, it first receives an acknowledge message from receivers 1 and 3, "Ack RCV1"; "Ack RCV1" followed by an acknowledge message from receiver 2. Once, acknowledge messages have been received from all receivers, transmitter 20 broadcasts a second data word, data2, and then again waits for acknowledge messages from the receivers. In the case of FIG. 2B, it first receives confirmation from receiver 2, then from receiver 1 and at last from receiver 3 at which time it can broadcast the next data word and so forth.

For detecting the moment when acknowledge messages have arrived from all receivers, the invention contemplates to include a synchronizer module in the transmitter, as illustrated in the block diagram of FIG. 3. This synchronizer 30 collects all acknowledge messages from the receivers, receivers 0 . . . n, using the n receiver acknowledge inputs, and creates an indication when the next data can be transmitted.

Figure 4:
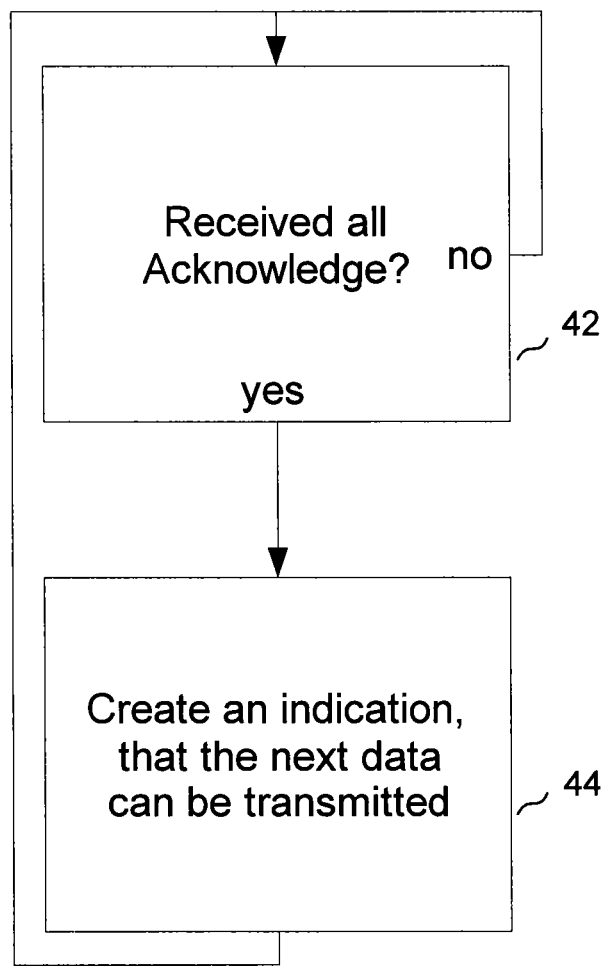
FIG. 4 shows an operation flowchart of the synchronizer of FIG. 3.

A flow chart of the operation of the synchronizer is shown in FIG. 4. The synchronizer waits until acknowledge messages have been received from all receivers, in step 42, and then generates an indication, telling the transmitter to send the next data, in step 44.

Preferred embodiments of the invention will now be described in detail with reference to FIGS. 5 and 6.

Figure 5A:
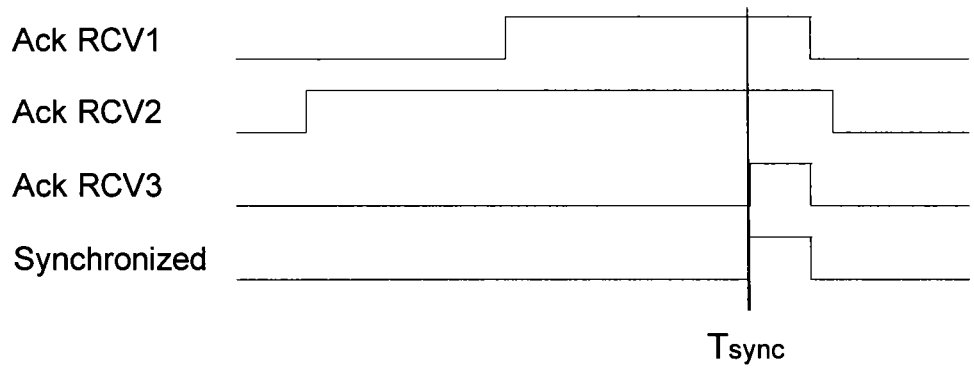
FIG. 5A illustrates a signal form according to a first embodiment.
Figure 6A:
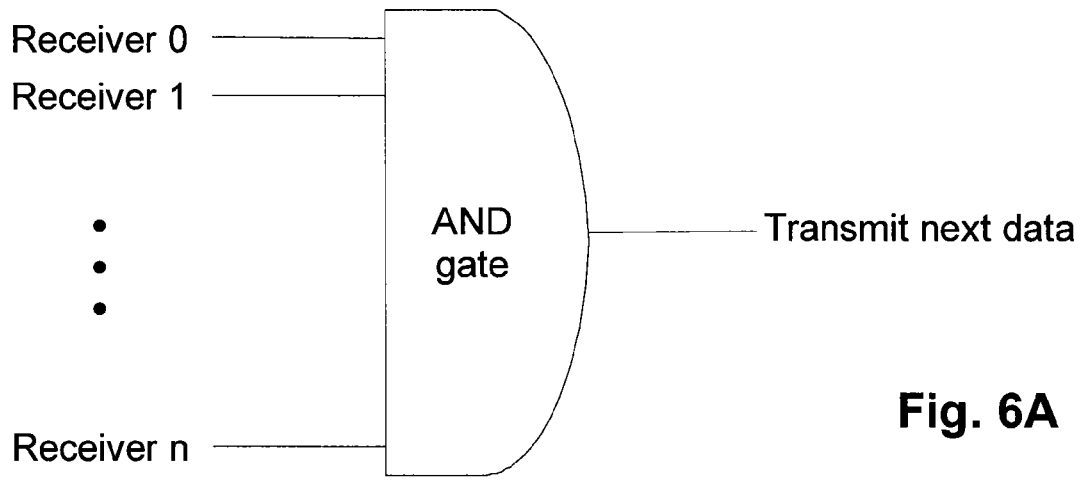
FIG. 6A shows an implementation of the synchronizer of FIG. 3 in case of the signal form of FIG. 5A.

In a first embodiment, synthesizer 30 is level based, e.g. when a receiver receives a data word, its ACK signal goes to high level. Synchronization is reached when all acknowledge signals from the receivers are "high". This is illustrated in FIG. 5A at time $T_{sync}$. The implementation of synchronizer 30 is really simple, if the acknowledge message is transmitted on a 1-bit line. In that case, the synchronizer consists of a logical gate, typically a logic AND gate, as illustrated in FIG. 6A. When all three ACK signals, Ack RCV 1-3 of FIG. 5A have been received, the AND gate of FIG. 6A outputs an "1" meaning all acknowledgements have been detected and the next data word can be transferred.

Figure 5B:
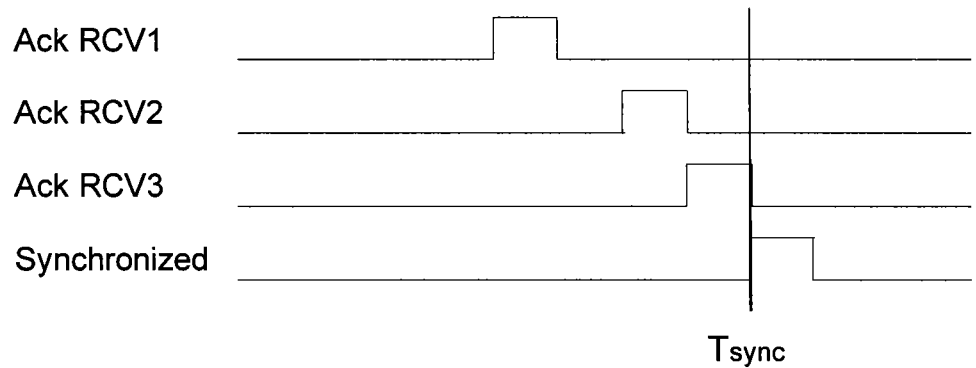
FIG. 5B illustrates a signal form according to a second embodiment.
Figure 6B:
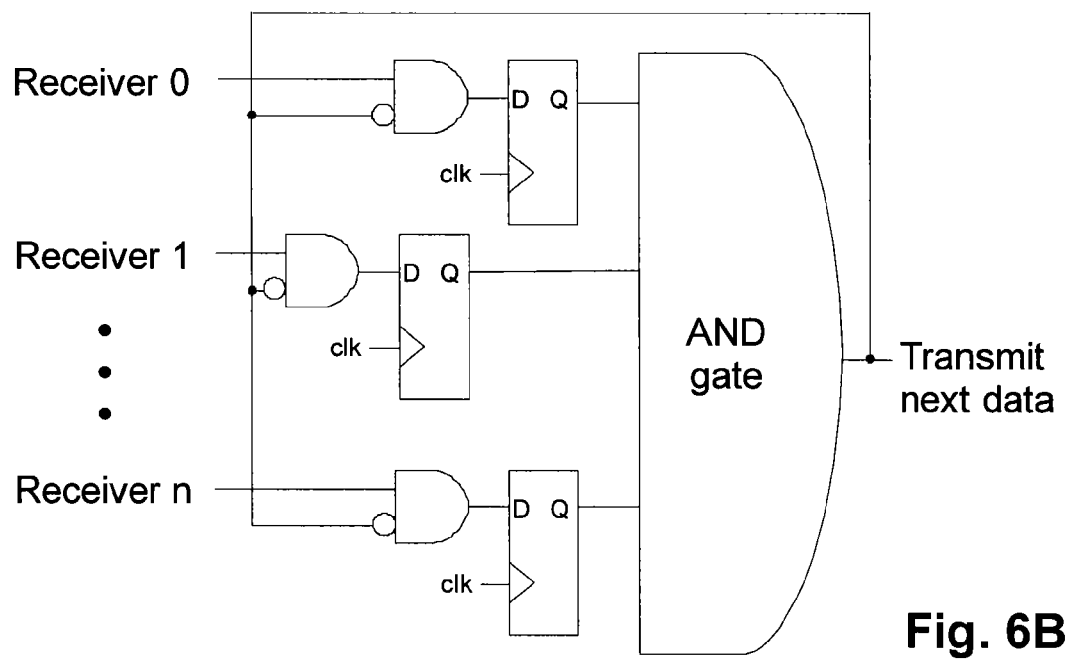
FIG. 6B shows an implementation of the synchronizer of FIG. 3 in case of the signal form of FIG. 5B.

In a second embodiment, the receivers acknowledge by a high active pulse, as illustrated in FIG. 5B. In this case, the synchronizer has to capture these pulses. Synchronization is done, when all pulses are captured which is illustrated in the Figure at time $T_{sync}$. An implementation of synchronizer 30 for this case is shown in FIG. 6B. A little edge detection unit or state machine is added in each Ack input path which traps each pulse, and the outputs thereof are "AND"-ed to detected when the next data word can be transferred.

In a particular embodiment, the broadcasting method of the invention can be employed with the applicant's Simple Streaming Link (SSL) transfer protocol disclosed in EP application 09 016 149.8 entitled "A Method for High Speed Data Transfer".

Figure 7:
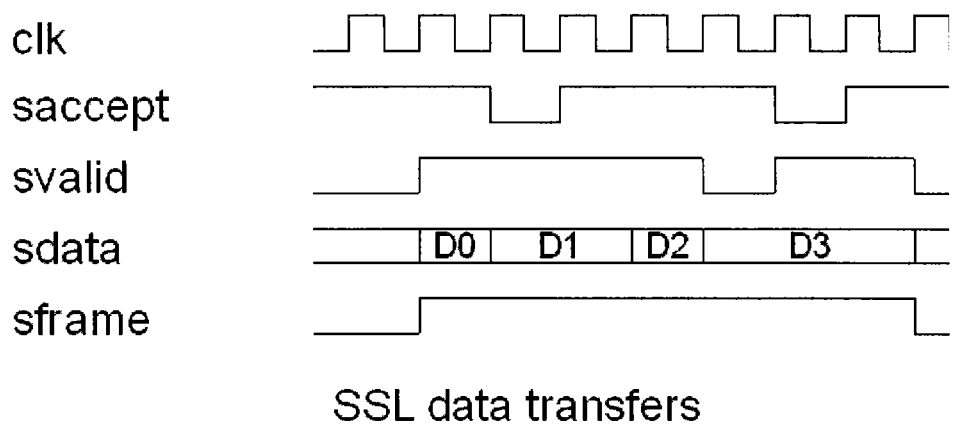
FIG. 7 shows an example of a data streaming protocol that can be used with the invention.

FIG. 7 shows the streaming signals used according to the SSL transfer protocol for data transfer through a plurality of functional units of an SoC. SSL comprises four signals: data, svalid, saccept, sframe. A data signal can have a width of multiple bits, e.g. 7, 16, 24, 32 bits. The valid/accept signals are similar to that from other handshake-based transfer protocols and are used to drive and stall the communication from source to sink. Source and sink can set or reset these signal at any time. Data is taken over if both are "high" on the rising edge of the clock. Data source and data sink must have the same understanding of what the sframe signal means. Data source and data sink, herein, can be any of the functional units of an SoC. A 'frame' in the sense of the SSL transfer protocol is a logical group or sequence of data, such as e.g. an OFDM symbol, a block of control data, a block of information data, etc.

Used in conjunction with the method for synchronizing data broadcast according to the present invention, transmitter 20 of FIG. 2 corresponds to a data source and receivers 1-3 correspond to a data sink. The data frame consisting of data elements D0, D1, D2, D3 in FIG. 7 is equivalent to a data word, data1 or data2, in FIG. 2. The accept signal of FIG. 7 correspond to acknowledge signals Ack RCV1-3 of FIG. 2. However, it has to be understood that the invention is not limited to be used in conjunction with this particular transfer protocol but can generally be used with any handshake-type bus protocol.

The invention claimed is:

1. A method for synchronizing broadcast and reception of streaming data between a transmitting data processing unit of a system-on-a-chip (SoC) and a plurality of receiving data processing units of the SoC, the method comprising:
   the transmitting data processing unit broadcasting a first data word of the streaming data to said plurality of receiving data processing units;
   each of the plurality of receiving data processing units returning an acknowledge signal pulses to said transmitting data processing unit upon reception of said first data word; and
   receiving the acknowledge signal pulse from each of the receiving data processing units at an AND gate of a synchronizer in the transmitting data processing unit; and
   upon reception of the last acknowledge signal pulse, generating, at an output of the AND gate, an indication when a next data word of the streaming data can be transmitted;
   wherein a maximum latency between receiving the first data word and returning the acknowledge signal of each receiving data processing unit of the plurality of receiving data processing units is not predictable.

2. The method of claim 1, wherein the acknowledge signal pulse is one of a one-bit level signal and a pulse signal.

3. The method of claim 1, wherein the streaming data includes a plurality of symbols for wireless communication.

4. A device comprising:
   a transmitting processing unit of a system-on-a-chip (SoC), the transmitting processing unit configured to broadcast a first data word of streaming data to a plurality of receiving processing units of the system-on-a-chip (SoC), to detect an acknowledge signal from each receiving processing unit of the plurality of receiving processing units and to generate an indication when a next data word of the streaming data can be transmitted upon reception of a last acknowledge signal;
   the plurality of receiving processing units, each receiving processing unit of the plurality of receiving processing units configured to parallel process the streaming data, and to generate and provide an acknowledge signal pulse to the transmitting data processing unit upon reception of the first data word, wherein latency between reception of the first data word and generation of the acknowledgement signal by each receiving processing unit of the plurality of receiving processing units is not predictable; and
   a synchronizer, having an AND gate, connected to each of the receiving data processing units and adapted to receive a data acknowledge signal pulse indicative of reception of a first data word of the streaming data from each of the receiving data processing units at the AND gate and, upon reception of a last acknowledge signal pulse, to generate, at an output of the AND gate, an indication when a next data word of the streaming data can be transmitted.

5. The device of claim 4, wherein the transmitting processing unit includes a synchronizer connected to each of the receiving data processing units, the synchronizer configured to detect the data acknowledge signal indicative of reception of a first data word of the streaming data from each of the receiving data processing units and, to generate the indication upon reception of the last acknowledge signal.

6. The device of claim 4, wherein said acknowledge signal pulse is a one-bit level signal.

7. The device of claim 4, wherein said synchronizer comprises a number of edge detection elements connected to the AND gate.

8. The device of claim 4, wherein a first receiving data processing units of the plurality of receiving data processing units includes one of a filter, a demodulator, a forward error correction (FEC) processor, a fast Fourier transform (FFT) processor, or a parameter estimation processor; and
   wherein a second receiving data processing units of the plurality of receiving data processing units includes one a filter, a demodulator, a forward error correction (FEC) processor, a fast Fourier transform (FFT) processor, or a parameter estimation processor.

* * * * *